Patented Apr. 30, 1935

1,999,405

UNITED STATES PATENT OFFICE 1,999,405

MANUFACTURE OF PLASTIC MATERIALS

Henry Dreyfus, London, England

No Drawing. Application March 26, 1931, Serial No. 525,617. In Great Britain May 20, 1930

3 Claims. (Cl. 106—40)

This invention relates to the manufacture of plastic and celluloid-like masses, moulding powders and the like, having a basis of cellulose acetate or other cellulose esters or ethers, and to the manufacture of articles therefrom.

In the manufacture of such materials the plasticizing agent is usually incorporated with the aid of relatively large quantities of volatile solvent or non-solvent for the cellulose derivative, for example proportions of the order of 100 to 200% on the weight of the cellulose derivative. Cellulose acetate for example is kneaded with a solution of the plasticizer in benzene-alcohol or in alcohol alone and the whole worked up into a plastic mass with or without subsequent evaporation of part of the solvent. When the plastic mass thus obtained is worked up into the desired articles, a process known as seasoning is required to eliminate the volatile liquids, since if these liquids are not eliminated the sheets or other articles formed from the plastic mass are liable to warping.

The object of the present invention is to produce moulding powders, plastic or celluloid-like masses and the like in which the plasticizer is homogeneously incorporated with the cellulose acetate or other cellulose derivative, and at the same time the mass contains little or no volatile solvent. It is especially advantageous to work the process of the present invention so that the plastic mass or moulding powder contains at the most an amount of volatile liquid corresponding to that left in the ordinary plastic masses or articles after the seasoning treatment.

According to the present invention plasticizing agents are incorporated in masses, disintegrated or not, or in powders consisting of or containing cellulose acetate or other cellulose esters or ethers by applying the plasticizer in conjunction with a liquid and then removing the liquid vehicle prior to working the mass and/or prior to the manufacture of articles and the like therefrom. Preferably I use a liquid vehicle which is substantially a non-solvent or solute for the cellulose derivative and again for the purpose of rapid removal the liquid may be volatile, having for example a boiling point of the order of 60 to 100° C., or even very volatile, having a boiling point between 20 and 60° C.

For the purpose of the present invention I find that the ethers and particularly diethyl ether or other low boiling ethers are particularly valuable as the liquid vehicle in that they are substantially insoluble in the cellulose acetate and therefore do not readily enter into the composition. When therefore the cellulose acetate or other cellulose derivative has been treated with a solution of plasticizing agent in ether and the ether evaporated, substantially no volatile liquid remains in the mass or powder. I may further use for the purpose of the present invention other suitable liquid vehicles preferably such as can easily be removed, for example by evaporation, such as benzene, toluene, alcohol, methyl alcohol, benzene-alcohol (which is a non-solvent at ordinary temperatures) and the like.

In working according to the present invention the cellulose acetate or other cellulose derivative, preferably in the form of thin sheets or flakes or in more or less disintegrated or powdered form, is treated with a solution or suspension of the plasticizing agent in ether or other suitable liquid vehicle, the liquid vehicle removed or substantially removed and the mass then worked up into the desired form if required. In working with powders, flakes or with more or less disintegrated forms of cellulose acetate or other cellulose derivative, it is preferable that the size of the particles should be substantially uniform in order to obtain as uniform as possible an impregnation with the plasticizer. For this reason powders may, for example, be graded before applying the process of the present invention. Powders may of course require no further working up. Preferably before removing the liquid vehicle the whole is allowed to stand for some time, for example for ½ hour to 2 hours or more, to enable the cellulose acetate or other cellulose derivative to absorb the plasticizing agent. Again a further period may be allowed to elapse after the evaporation or other removal of the liquid vehicle. Instead of relying wholly upon evaporation for the removal of the liquid vehicle, part may be removed in the liquid state, as for instance by centrifuging, and the remainder volatilized or any other suitable method may be adopted.

Any suitable plasticizing agents may be used for the purpose of the present invention, for example the sulphonamides and particularly toluene sulphonamide, the isomeric xylene N-alkyl sulphonamides, e. g. the isomeric xylene N-methyl sulphonamides, sulphonanilides or other sulphonarylides, diphenylol propane or like plasticizing agents obtainable by condensation of phenols with ketones, ester plasticizing agents for instance alkyl phthalates, e. g. diethyl, dibutyl or diamyl phthalate, triacetin, resorcin diacetate, organic phosphates, for instance tricresyl and tri-phenyl phosphates (preferably used in conjunction with sulphonamides or other plasticizers which dissolve readily in the cellulose derivative) and esters of aromatic sulphonic acids. The plasticizer may be employed in any desired proportion depending on the qualities, and particularly the hardness, required in the final product, for example in proportions of 10, 20, 30 or 50% or more of plasticizer on the weight of the cellulose derivative. For the production of very hard or tough products the proportion of plasticizer incorporated should not in general exceed 20% of the weight of the cellulose derivative and is preferably less than 10% thereof.

Other additions may be made to the moulding powders or masses in accordance with the requirements of the product or article in view, for example natural or synthetic resins, stabilizers, such as urea or urea derivatives, dyes, pigments, effect materials, filling substances and the like. Such additions may be incorporated together with the plasticizing agent, particularly if soluble or miscible with the liquid vehicle employed, or they may be worked into the powders, masses or the like after incorporation of the plasticizing agent.

Again for the purpose of reducing flammability, if substantially non-inflammable products are required, suitable non-inflammators may be incorporated in the compositions. For this purpose mineral fillers, such as phosphates and the like may be employed, but I prefer to employ agents which are soluble in the cellulose acetate or other cellulose derivative or compatible therewith, for example halogenated and especially highly halogenated organic compounds. Of these I may mention the halogenated phenols and aromatic amines and their acidyl derivatives, for example trichlor-methyl acetanilide and tetrachlor-ethyl acetanilide. The best agents to use for this purpose are however the brominated derivatives of aromatic amines and particularly the brominated acidylated aromatic amines of prior U. S. application S. No. 366,100, filed 25th May, 1929, for example 2.4.6.-tribromdiacetanilide. Such halogenated organic compounds may themselves act as plasticizing agents and in fact may be the sole plasticizing agent present, but in general I prefer to employ them in conjunction with sulphonamide or like plasticizers. In order to prevent any deleterious action due to the presence of free halogen or to the liberation of halogen, small quantities of dicyandiamide or other agents capable of readily combining with halogen may be incorporated together with the agents for reducing flammability. With the brominated acidylated aromatic amines previously referred to such a precaution is however unnecessary in general.

In incorporating the plasticizers with or without other additions according to the process of the present invention the mass of cellulose acetate or the like preferably disintegrated, may be treated with considerable quantities of liquid vehicle, e. g. 100–200% or more on the weight of the cellulose acetate, containing the plasticizer and any other desired additions, and the whole allowed to stand as previously referred to. It is preferable however to apply comparatively limited quantities of liquid vehicle containing the required amount of plasticizer, and for this purpose spraying methods are to be preferred. The cellulose acetate flakes, powder or the like may for example be sprayed with a solution of sulphonamide in ether, the whole to stand for some time or until the evaporation of the ether is complete, and then worked up, if required, into plastic masses or directly into articles. Again sheets of the cellulose acetate, obtained directly from acetylation solutions with or without ripening or from any other suitable solutions, may be sprayed on one or both sides with the liquid vehicle containing the plasticizer and the liquid vehicle then evaporated or allowed to evaporate. As a further alternative the solution or suspension of plasticizing agent in ether or other liquid vehicle may be mixed with the disintegrated or powdered cellulose acetate and the whole sprayed from a suitable nozzle. The ether or other liquid vehicle may, if desired, be removed simultaneously with the spraying by spraying into a heated atmosphere or into an air current.

If desired the homogeneity of the product may be still further improved by kneading, preferably with heating, or by melting the mass or at least heating it to a sufficient temperature to induce a considerable softening. The mass after cooling may, if desired, be disintegrated to form moulding powders, if such be the required products. Or alternatively the melted or softened mass may be cast or moulded directly to form films, rods, tubes, slabs, sheets, blocks or other articles.

The cellulose acetate may likewise be warmed or heated during the actual application of the plasticizer in order to enhance its absorptive power. In such cases however it is preferable to avoid the use of benzene-alcohol or like liquids or liquid mixtures as vehicles, since at temperatures of about 70–80° C. they are solvents for cellulose acetate and even at lower temperatures considerable softening may result with consequent incorporation of the volatile liquid itself.

While the invention has been described more particularly with reference to cellulose acetate as the cellulose derivative to be employed it may also be applied to the production of moulding powders, plastic or celluloid-like masses or the like having a basis of other cellulose esters, for example cellulose formate, cellulose propionate, cellulose butyrate, or cellulose esters of acids containing a comparatively large number of carbon atoms, as for instance cellulose laurate, cellulose naphthenate, mixed cellulose esters, for example cellulose acetonitrate or cellulose ethers, for instance methyl, ethyl, or benzyl cellulose, or mixed ethers or mixed ether-esters.

What I claim and desire to secure by Letters Patent is:—

1. Process for the incorporation of a plasticizing agent in a mass consisting of derivative of cellulose, comprising spraying the mass with a liquid containing the plasticizer and then removing the liquid prior to any working of the plasticizer-containing cellulose derivative mass.

2. Process for the incorporation of a plasticizing agent in a mass consisting of cellulose derivative, comprising applying to the mass in a disintegrated form, the plasticizer in a liquid vehicle and then removing the liquid vehicle prior to any working of the plasticizer-containing cellulose derivative mass.

3. Process for the incorporation of a plasticizing agent in a mass consisting of cellulose acetate, comprising spraying the mass with a liquid containing the plasticizer and then removing the liquid prior to any working of the plasticizer-containing cellulose acetate mass.

HENRY DREYFUS.